(12) United States Patent
Tarbet et al.

(10) Patent No.: US 6,444,128 B1
(45) Date of Patent: Sep. 3, 2002

(54) ORGANIC WASTE REMOVAL FROM PROCESS STREAMS

(75) Inventors: Bryon J. Tarbet, Highland; Robert D. Hancock, Pleasant Grove; Jeffrey W. Zidek, Salt Lake City, all of UT (US)

(73) Assignee: Power Engineering Company, Salt Lake City, UT (US)

( * ) Notice: Subject to any disclaimer, the term of this patent is extended or adjusted under 35 U.S.C. 154(b) by 0 days.

(21) Appl. No.: 09/528,333

(22) Filed: Mar. 17, 2000

Related U.S. Application Data

(63) Continuation-in-part of application No. 09/123,675, filed on Jul. 27, 1998, now abandoned.

(51) Int. Cl.⁷ .............................................. B01D 21/01
(52) U.S. Cl. ..................... 210/725; 210/727; 210/730; 210/908; 127/50
(58) Field of Search .............................. 210/710, 723, 210/725, 727, 728, 730; 426/658; 536/102; 127/46.1, 48, 50, 53, 58, 71

(56) References Cited

U.S. PATENT DOCUMENTS

| | | | | |
|---|---|---|---|---|
| 3,853,616 A | | 12/1974 | Rundell et al. ............... 127/48 |
| 4,013,555 A | * | 3/1977 | Davis ......................... 210/725 |
| 4,173,532 A | * | 11/1979 | Keoteklian ................... 210/725 |
| 4,382,823 A | | 5/1983 | Gudnason ..................... 127/57 |
| 4,783,265 A | | 11/1988 | Timmons ..................... 210/666 |
| 5,022,999 A | | 6/1991 | Watanabe et al. ............ 210/692 |
| 5,110,363 A | | 5/1992 | Clarke et al. ............... 127/46.1 |
| 5,262,328 A | | 11/1993 | Clarke et al. ................. 436/17 |
| 5,429,749 A | | 7/1995 | Chung et al. ................ 210/734 |
| 5,531,907 A | | 7/1996 | Williams et al. ............. 210/727 |
| 5,543,058 A | * | 8/1996 | Miller ......................... 210/725 |
| 5,560,831 A | | 10/1996 | Bladen et al. ............... 210/704 |
| 5,569,385 A | | 10/1996 | O'Carroll et al. ........... 210/727 |
| 5,597,490 A | | 1/1997 | Chung et al. ................ 210/727 |
| 6,238,486 B1 | * | 5/2001 | Dunham et al. .............. 127/55 |

FOREIGN PATENT DOCUMENTS

| | | |
|---|---|---|
| CS | 270926 | 7/1991 |
| JP | 54-118656 | * 9/1979 |

* cited by examiner

*Primary Examiner*—David A. Simmons
*Assistant Examiner*—Frank M. Lawrence
(74) *Attorney, Agent, or Firm*—Workman, Nydegger & Seeley

(57) ABSTRACT

The precipitation and removal of suspended organic containing particles, such as starch, and other suspended solids from a given solution can be accomplished by the addition of multivalent metal ions and their complexes in order to form metal ion/organic particle complexes and the addition of a flocculating agent to flocculate the metal ion/organic particle complexes into insoluble particles capable of removal by conventional technology.

19 Claims, No Drawings

ORGANIC WASTE REMOVAL FROM PROCESS STREAMS

This application is a continuation-in-part of U.S. application Ser. No. 09/123,675 filed Jul. 27, 1998 now abandoned.

BACKGROUND OF THE INVENTION

The present invention relates generally to methods for the precipitation and removal of starch and other carbohydrate and sugar unit containing organic waste, typically measured as either chemical oxygen demand ("COD") or biological oxygen demand ("BOD"), and other suspended solids from a wide range of process streams.

The presence of undissolved organic particles and soluble components which contain starch or other carbohydrates in industrial process streams represents significant environmental problems due to the COD/BOD levels resulting from the starch's presence. Increasingly stringent regulations on the COD/BOD levels in water which can be discharged into the environment places many facilities presently outside of compliance with these environmental regulations. The presence of these starch particles in any given process stream may result from starch addition to upstream processes such as in paper manufacturing, or simply as a natural result of cleaning raw vegetables of dirt in preparation for further processing. Additionally preparation of foods high in starch such as pasta, rice, wheat, corn etc. also naturally results in water streams containing significant amounts of starch.

While the relatively large pieces of vegetable matter which become detached and suspended in solution during the washing of the vegetable may be easily removed through filtration or settling, small suspended vegetable pieces and other starch particles intermixed with other suspended solids such as dirt, silica, or any other process component typically cannot be removed by simple filtration, flocculation, or settling. Consequently more complex measures must be taken in order to remove these suspended particles.

Some facilities presently resort to simply dumping large quantities of high COD starch-containing water into fields where the organic matter is decomposed on the ground. While such activity prevents the high COD water from introduction into lakes, rivers and streams, it prevents the reuse of large volumes of process water and can result in the release of significant odors which make it undesirable in even sparsely populated regions.

Other processes, such as ultrafiltration, can ultimately remove almost any suspended solid particle, even the suspended starches, thereby allowing for the reuse and recycling of the now clarified water back into the process. While such methods can significantly reduce the quantity of water required in a given process and prevent the discharge of high COD water into the environment, the high cost of capital equipment, maintenance and operation make such processes prohibitively expensive for a large number of applications.

A process capable of easy, efficient and nearly quantitative removal of suspended starch and other COD-producing components from a wide range of industrial process streams thereby allowing for ready discharge of said streams into the environment or reuse and recycle of said streams would be a great advancement in the art.

SUMMARY AND OBJECTS OF THE INVENTION

The present invention provides a process for the precipitation and easy removal of suspended starch, other carbohydrate or sugar unit containing organic particles and components which organic matter creates high quantities of Chemical Oxygen Demand ("COD") or Biological Oxygen Demand ("BOD"), as well as other suspended solids from a given solution. The process includes the steps of adding a complexing agent, such as multivalent metal ions and their complexes, capable of interacting with the organic particles and components and subsequently adding a flocculating agent to facilitate the precipitation of the organic containing particles and components. Once the suspended particles and components have been precipitated into larger, more easily filtered particles, they can be readily removed by conventional filtration or other known methods in the art. A wide variety of complexing agents can be employed. These complexing agents can be multivalent metal ions and their complexes. The choice of the complexing agent used to create the interaction with the organic particles and components and the specific flocculating agent used will dictate the required process parameters.

Where the interaction between the complexing agent and organic particles and components is relatively weak, addition of a base to raise the pH and thereby deprotonate the hydroxyl groups found in sugars and other polysaccharides and/or the addition of excess complexing agent to facilitate the complexing agent particles and components interaction may be advantageous. Where the interaction between the complexing agent and the organic particles and components is relatively strong, a lower pH and comparatively lower concentrations of metal ions can still produce the desired results. Additionally, mixtures of different complexing agents can also be employed to produce the disired interactions.

With the complexing agents now associated with the organic particles and components, the subsequently introduced flocculating agent will then also interact with the complexing agents associated with the organic particles and components. This interaction of the flocculating agent with the complexing agents then produces a large, neutral and substantially organic complex which is insoluble in the solution and which will more easily precipitate so as to assist in removing the organic content from the solution. As the flocculating agent precipitates the organic particles and components, it will also capture the other suspended solids such as silica, dirt, etc.

Different types of flocculating agents can be employed to produce the desired precipitation. Typically, large synthetic organic polymers may be used depending on the type and quantity of complexing agent used. Additionally, naturally occurring polymers, such as pectin, can also be used as a flocculent to provide an all "natural" process free of "man-made" chemicals.

With the organic particles and components now in the form of large precipitated floc, any number of conventional processes can be employed to facilitate removal of the precipitated particles. Additionally, the proper combination of added complexing agent and flocculating agent can be employed to produce a precipitate capable of use in animal feed, thereby reducing the quantity of material introduced into solid waste disposal systems or landfills.

With the organic particles and components and other suspended particles now precipitated and removed from the process stream, the process stream water can be legally discharged into the environment within government regulations, or else recycled or otherwise reused as desired within existing processes.

Accordingly, an object of the present invention is to create a process which produces readily removable precipitated organic particles and components and other suspended solids to facilitate these particles easy removal.

Yet another object of the present invention is to create a process which allow for the reuse and recycling of the water in process streams initially containing high amounts of organic particles and components by reducing the COD/BOD content, thereby facilitating recycling of the process stream and thereby reducing the net quantity of water required by a particular process.

It is a further object of the present invention to create a process which produces products which can be readily incorporated into animal feed.

It is yet another object of the present invention to create a process for removal of the COD/BOD content from water without adding additional contaminants to the water so as to not hamper disposal of the water into the environment.

It is yet another object of the present invention to create an all natural process for removal of the organic particles and components.

These advantages in addition to other objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

DETAILED DESCRIPTION OF THE PREFERRED EMBODIMENTS

This invention provides a process and method for the removal of suspended starch, other carbohydrate or sugar unit containing organic particles along with soluble sugar unit components, which will be referred to as organic particles and components, from a polar solvent such as water. Typically, these organic particles and components are measured in a solution as Chemical Oxygen Demand ("COD") or Biological Oxygen Demand ("BOD"). For the purposes of this invention these two designations, COD and BOD, will be used interchangeably. Additionally, while the following detailed description will focus on the removal of starch particles from different water-based solutions, the invention is not limited only to starch removal from water.

While starch is the most common COD-causing organic particle suspended in a solution and water the most common solution medium, one skilled in the art will recognize the principles taught herein can apply to any suspended particle or dissolved component containing organic carbohydrate or sugar unit components, even if other nonorganic elements are present. These carbohydrate and sugar unit components contain the same reactive sites as starch and are capable of complexing with multivalent metal ions or their complexes, in any polar liquid. For example, starch is widely recognized as a mixture of two different polymeric forms of the sugar D-glucose ($C_6H_{12}O_6$) units with $\alpha(1,4)$-linked sugar units, where cellulose, like the starches, is also a polymer of D-glucose but with $\beta(1,4)$-links of the sugar units. Additionally, a nearly infinite variety of compounds, commonly referred to as polysaccharide and carbohydrates, contain various sugar units. Based on the following description, one skilled in the art will recognize that the principles described in connection with starch particles will apply equally well to any sugar-unit containing particle or component capable of complexing the metal ions or their complexes.

This invention provides a process for precipitation and removal of suspended organic particles and components, typically starch, and other suspended solids from a given solution. This process utilizes a complexing agent, such as a multivalent metal ion or one of its complexes, to interact with functional groups of the organic particles. The complexing agent will typically be selected from the group of multivalent ions such as ferrous, ferric, calcium, aluminum ions and the aluminum complex of aluminate, although one skilled in the art will recognize that other transition and alkaline earth metals and their complexes can be substituted for the above listed group. This interaction or binding of the complexing agent with or to the starch particle then allows the starch and complexing agent particle to interact with a flocculating agent to create a large, neutral and insoluble compound which readily precipitates from a given solution.

Presently, the use of anionic organic polymeric flocculating agents represents the most preferred embodiment of the present invention, although anionic inorganic polymers can also be employed. Additionally, since the multivalent metals will also have associated anions, it is possible and within the scope of the present invention to also use cationic flocculating agents to interact with the starch and metal ion and anion negatively charged particle to produce results similar to those described with the anionic flocculating agents.

Different types of organic flocculating agents can be employed to produce the desired precipitation. Typically, large synthetic polymers such as polyacrylamides, polycarboxylates, and polyamines may be used depending on the type and quantity of complexing agent used. Additionally, naturally occurring polymers, such as the polycarboxylate known as pectin, can also be used as a flocculating agent to provide an all "natural" process free of "man-made" chemicals.

One skilled in the art will recognize that where an anionic polymer flocculating agent, such as a polyacrylamide or a polycarboxylate, is employed to create the flocculate, the pH of the solution will preferably be above about pH 5. This pH above about pH 5 will allow the needed interaction to create the desired insoluble flocculate.

Further, one skilled in the art will recognize that where a cationic polymer flocculating agent, such as a polyamine, is employed to create the desired flocculate, the pH of the solution will preferably be below about pH 6 in order to facilitate the needed interaction to create the desired insoluble flocculate. However, where the solution pH is reduced to below about pH 4, not only will excess components of acid or complexing agent be typically required thereby making the process more expensive, but the possible hydrolysis of the starch at these pH levels will create similar individual organic particles and soluble components, thereby causing the overall process efficiency to diminish.

As will be evident from the examples, the choice of complexing agent will also dictate the required process parameters.

For example, where the interaction between the complexing agent and COD generating organic particle is relatively weak, for example in the interaction of $Ca^{2+}$ with starch, the solution's pH is advantageously increased to at least above about 10.5 to sufficiently allow for coordination of the $Ca^{2+}$ with the starch particle. Typically, this can be accomplished by adding the $Ca^{2+}$ ion as $Ca(OH)_2$. This is compared to the ability to create an interaction between $Al^{3+}$ ion and starch at a pH of less than about 6. Likewise, when some or all of the aluminum is added as aluminate, the aluminate/starch complex can form at a pH as low as 4. The aluminate provides a complexing agent capable of interaction with the starch and other organic particles and components in a wide range of pH's. As demonstrated in the examples shown below, the presence of aluminate as a complexing agent, therefore, reduces the required pH needed to create the starch/complexing agent interactions as compared to the typically required solution pH when the aluminate is not present. Specifically, the examples which utilize aluminate as at least part of the added complexing agent show the preferred range of solution pH of between about pH 5 and about pH 10. when an anionic polymer flocculating agent is employed. This compares to a desired solution pH of above about 10 when aluminate is not present.

The concentration of added complexing agent will also affect the metal ion and starch interaction. One skilled in the art will recognize that, as for any reaction, an excess of one reactant will tend to drive the reaction equilibrium toward completion. In this process that means that large excesses of complexing agent can be used to create the needed starch+ complexing agent interaction. While such a process will require increased quantities of both complexing agent and flocculent, it is clearly intended to be within the scope of the present invention.

With the complexing agent now bound to the organic particle or component, the subsequently added polymeric anionic flocculating agent then interacts with the complexed organic particle or component to produce a large neutral molecule which readily precipitates out of the solution. The creation of these large floc particles may also cause the other suspended particles, such as silica, to be incorporated into the precipitated particles resulting in the removal of the other suspended solids out of the solution as well. This precipitate can now be readily removed by any method known in the art such as filtration or settling.

As evidenced in the examples, an important aspect of the invention is the control of solution pH. Only with the correct number of hydroxyl or other anionic coordinating groups bound to the complexing agent and organic (e.g. starch) and flocculent complex will the overall charge neutrality required to cause precipitation be achieved. The binding of hydroxyl or other anionic groups to the complexing agents in the complexing agents/starch/flocculent complex is very precisely controlled by the solution pH.

With the starch particles and other organic components now precipitated by the flocculating agent and removed from the process stream, the process stream's water can be legally discharged into the environment within governmental regulations, or else recycled or otherwise reused as desired within the existing process.

Subsequent uses for the precipitated COD-generating organic particles and components or floc, will depend upon the specific content of the removed organic components and the metals used. Where nontoxic metals such as calcium or complexes such as aluminate are employed and starch particles are removed, the organic particles and component and calcium or aluminate and anionic flocculent precipitate can be used as an animal feed.

Examples of different preferred embodiments of the invention are provided below. These examples are not at all intended to limit the scope of the present invention, but instead serve to show a few of the nearly infinite variations on the process steps. Furthermore, one skilled in the art will recognize that the percentages of lowering of the COD content can be diminished or increased with changes in the quantities of metal ion and/or flocculent added and these examples in no way are intended to limit the quantity, either absolute or relative, or type of organic components capable of removal. While the following examples disclose the use of $Al^{3+}$ added as a sulphate and aluminate, calcium hydroxide, ferric chloride and ferrous sulphate as complexing agents for interactive binding of with the starch particles, one skilled in the art will recognize the ability to readily substitute other transition group metals into the various examples.

EXAMPLE 1

A model starch solution was prepared and flocculated as follows: 0.5 grams of amylopectin was suspended in 200 ml water and heated to 170° F. While the solution was still hot, 0.023 grams of $FeCl_3$ in 2.5 ml $H_2O$ were added with stirring, followed by 0.1 grams of a 45% solution of $Na(Al(OH)_4)$. There was an instant orange floc leaving a clear supernate. The COD on the supernate was 120 ppm, which compared to a COD of 2500 ppm on the starting solution corresponds to a 96% reduction in COD, and the pH of the supernate was measured at approximately 9.8.

EXAMPLE 2

A synthetic potato waste solution was prepared by suspending 16.7 grams of potato peelings in 1 liter of cold water, and then heating this and boiling it for five minutes. The hot solution was blended for 1 minute in a kitchen blender, and then filtered through a coarse filter. The COD on the filtrate was 3080 ppm. 200 ml of the filtered solution was heated to 170° F., and then 0.04 grams of $FeCl_3$ in 2.5 ml $H_2O$, followed by 0.2 grams of a 45% $Na(Al(OH)_4)$ solution and 4 ml of a 0.25% solution of an anionic polyacrylamide polymer was added to the stirred solution. An orange floc formed immediately. The COD on the supernate was 1110 ppm, which corresponded to a 64% removal of COD, and the pH of the supernate was measured at approximately 10.1.

EXAMPLE 3

A synthetic potato waste solution was prepared by boiling 60 grams of potato slices in 1 liter water for five minutes, blending the solution for one minute, and straining the solution through a cloth. The COD on the solution was 11,700 ppm. 200 ml of this solution heated to 202° F. and 0.4 grams of $Al_2(SO_4)_3 \cdot 14\ H_2O$ in 5 ml $H_2O$, 20 drops of $Na(Al(OH)_4)$, and 8 ml of a 0.25% solution of an Anionic Polyacrylate Polymer was added with stirring. A white voluminous floc formed. The COD on the supernate was 2900 ppm, which corresponded to a 58% removal of organic waste, and the pH of the supernate was measured at approximately 9.9.

EXAMPLE 4

A synthetic potato waste solution was prepared as described in Example 2. The COD on this solution was 2850 ppm. 200 ml of this solution was allowed to cool to 81° F. 0.202 grams of $FeSO_4 \cdot 7\ H_2O$, 4 drops of 45% $Na(Al(OH)_4)$ solution, and 5 ml of an anionic polyacrylate polymer were added. The COD on the supernate was 875 ppm, which yielded a 69% reduction in COD, and the pH of the supernate was measured at approximately 9.7.

EXAMPLE 5

One liter of an effluent from a pasta manufacturing facility, (pH=6.39), 0.02 grams of $Al_2(SO_4)_3 \cdot 14\ H_2O$ in 5 ml water, 2 drops 45% $Na(Al(OH)_4)$ solution, and 4 ml a 10.1% solution of an anionic polyacrylate polymer were stirred at room temperature. A white floc formed and settled rapidly.

The COD decreased from an initial value of 2240 ppm on the waste solution to 407 ppm on the supernate of the flocculated solution, an 82% reduction in COD, and the pH of the supernate was measured at approximately 7.5.

EXAMPLE 6

An effluent waste solution was obtained from a potato processing facility that manufactured potato flakes from fresh potatoes. The effluent waste solution had an initial pH of approximately 6.5. 400 ml of the solution was stirred at 78° F. and 0.2 grams of $Al_2(SO_4)_3 \cdot 14\ H_2O$ dissolved in 5 ml $H_2O$ was added, followed by 0.8 grams of a 45% solution of $Na(Al(OH)_4)$ followed by 4 ml of a 0.25% solution of an anionic polyacrylate polymer. A tightly binding thick floc formed, leaving a clear colorless supernate. The COD on the initial solution was 3200 ppm, and that of the supernate was 1370 ppm, a 57% reduction in COD. The pH of the supernate was measured at approximately 9.2.

EXAMPLE 7

A waste solution was obtained from a plant manufacturing potato chips (COD=8785 ppm). The waste solution had an initial pH of approximately 6.7. 400 ml of this waste solution was stirred and 0.2 grams of $Al_2(SO_4)_3 \cdot 14\ H_2O$ dissolved in 5 ml $H_2O$ was followed by 2 drops of a 45% $Na(Al(OH)_4)$ solution and 2 ml of a 0.25% solution of an anionic polyacrylate polymer. A dense white floc formed and settled rapidly. The COD on the supernate was 1750 ppm, which represented an 80% reduction, and the pH of the supernate was measured at approximately 9.4.

EXAMPLE 8

A waste solution from a hot cooking process was obtained from a potato processing facility, with a COD of 28,500 ppm and a pH of approximately 6.5. 500 ml of this solution stirred at 116° F. and 4 grams of $Ca(OH)_2$ slurried in 10 ml of water was added followed by 8 ml of 0.25% solution of an anionic polyacrylate polymer. The solution turned yellow, and a heavy yellow floc formed. The COD on the supernate was 2240 ppm, which corresponded to a 92% reduction in COD, and the pH of the supernate was measured at approximately 12.3.

EXAMPLE 9

A Waste Solution was obtained from a potato chip manufacturing company. The COD of this solution was 6090 ppm and the pH was 6.0. 400 ml of this solution was stirred at 68° F., and 0.2 grams of $Ca(OH)_2$ in 5 ml $H_2O$ was added, followed by 2 ml 0.25% anionic polyacrylate solution. The COD on the supernate after flocculation was 1880 ppm, which gave a 69% reduction, and the pH of the supernate was measured at approximately 10.4.

EXAMPLE 10

A waste solution from a potato processing facility had a COD of 3730 ppm and an initial pH of approximately 6.4. 400 ml of the above solution was stirred and 0.2 grams of $Al_2(SO_4)_3 \cdot 14\ H_2O$ in 5 ml $H_2O$, then 0.2 grams of $Ca(OH)_2$ suspended in 5 ml water was added. After stirring for 5 minutes, 2 ml of a 0.25% solution of anionic polyacrylate was also added. A white floc formed leaving a clear supernate which had a COD of 1150 ppm, which represented a 69% reduction in COD, and the pH of the supernate was measured at approximately 11.

EXAMPLE 11

A synthetic waste solution was prepared by blending 24.0 grams of raw potato slices in 1 liter water for 1 minute, and then heating to 180° F. for 5 minutes, which gave a COD of 5630 ppm. 300 ml of this solution was cooled to 96° F. To this, with stirring, was added 0.057 grams of $FeCl_3$ in 2 ml water, followed by 0.2 grams of $Ca(OH)_2$ suspended in 5 ml $H_2O$, and 1 ml of 0.25% anionic polyacrylate solution. A light orange floc formed. The COD of the supernate was 560 ppm, a 90% removal of COD, and the pH of the supernate was measured at approximately 9.8.

EXAMPLE 12

A waste solution from a pasta processing facility had a COD of 1630 ppm and a pH of 9.1. The pH was adjusted to 5.2 with concentrated $H_2SO_4$. 0.08 grams of a 45% $Na[Al(OH)_4]$ solution and 4 ml of 0.25% anionic polyacrylate solution was added to 1000 ml of the solution. A white floc resulted leaving a clear supernate with pH of 6.3. The COD of the supernate was 317 ppm, which represented an 81% removal of COD.

EXAMPLE 13

Waste water entering a clarifier on a potato processing facility at 105° had a pH of 6.5 and a COD of 7000 ppm. The pH was adjusted to about 5.0 with concentrated $H_2SO_4$. 300 ppm of 45% $Na[Al(OH)_4]$ was added which raised the pH to 7.5. 10 ppm of an anionic polyacrylate was added. An immediate white floc formed, leaving a clear supernate. The COD on the supernate was 300 ppm, which was a 96% removal of COD.

EXAMPLE 14

Waste water from a carrot processing facility had a pH of 7.1, COD of 670 ppm and total suspended solids which measured 3200 ppm. The pH of the solution was adjusted to pH 5.2 with concentrated sulfuric acid. Approximately 100 ppm of $Na[Al(OH)_4]$ was added to 1.0 liter of the pH adjusted waste water, which raised the pH of the solution to approximately 6.1. 4.0 ml of a 0.25% solution of an anionic polyacrylamide polymer was then added, creating a flocculent. The COD on the supernate was 60 ppm, which was a 91% reduction, and the total suspended solids were 75 ppm, which was a 98% reduction.

EXAMPLE 15

Waste water from a carrot processing facility had a COD content of 1400 ppm and total suspended solids which measured 2400 ppm. The pH of 1.0 liter of solution was adjusted to pH 5.2 with sulfuric acid. Approximately 100 ppm of $Na[Al(OH)_4]$ was added to the solution which raised the pH of the solution to approximately 6.5. 1.0 ml of a 1% solution of pectin was then added, creating a flocculent. The COD of the supernate was measured at 260 ppm, which was an 81% reduction, and the total suspended solids were 40 ppm, which was a 98% reduction.

EXAMPLE 16

Waste water containing lactose with a pH of 5.2 was treated by the addition of approximately 50 ppm of $Na[Al(OH)_4]$, which raised the pH of the solution to approximately 5.7, followed by the addition of approximately 10 ppm of a cationic polyacrylamide polymer. A flocculent formed rapidly reducing the COD content of the solution by 80%.

Although preferred embodiments of the invention are described herein in detail, it will be understood by those skilled in the art that variations may be made thereto without departing from the spirit of the invention or the scope of the claims.

What is claimed and desired to be secured by United States Letters Patent is:

1. A method for removing suspended sugar unit containing particles from a solution, said method comprising:

treating said solution with at least one complexing agent;

adding a flocculating agent to said solution in order to form a plurality of insoluble flocculate particles which contain said sugar unit containing particles, said solution having a pH which is not reduced below about 5 prior to treating said solution with said complexing agent; and removing at least a portion of said insoluble flocculate particles from said solution.

2. A method according to claim 1 wherein said complexing agent includes an aluminate.

3. A method according to claim 2 wherein said complexing agent further includes multivalent metal ions selected from the group consisting of $Fe^{2+}$, $Fe^{3+}$ and $Al^{3+}$.

4. A method according to claim 1 wherein said flocculating agent is an anionic polymer flocculent.

5. A method according to claim 1 wherein said flocculating agent is a cationic polymer flocculent.

6. A method according to claim 1 wherein said suspended sugar unit containing particles contain starch.

7. A method according to claim 1 wherein said removed insoluble flocculate particles are suitable to be used as an animal feed.

8. A method for precipitating sugar unit containing particles from an aqueous solution, said method comprising:

treating said aqueous solution with an aluminate to allow said aluminate to complex with said sugar units contained in said particles to form aluminate/particle complexes said solution having a pH which is not reduced below about 5 prior to treating said solution with said aluminate;

adding a flocculating agent to said aqueous solution in order to flocculate said aluminate/particle complexes into a plurality of insoluble flocculate particles; and removing at least a portion of said insoluble flocculate particles from said aqueous solution.

9. A method according to claim 8 wherein said aqueous solution additionally contains soluble organic components, at least a portion of which complex with said aluminate, form into a plurality of insoluble flocculate particles upon addition of said flocculating agent and are removed from said aqueous solution.

10. A method according to claim 8 wherein the pH of said aqueous is between about pH 5 and about pH 10 when said flocculate particles are formed.

11. A method according to claim 10 wherein said flocculating agent is an anionic polymer flocculent.

12. A method according to claim 11 wherein said flocculating agent is a naturally occurring polymer.

13. A method according to claim 12 wherein said naturally occurring polymer is pectin.

14. A method according to claim 8 wherein the pH of said aqueous solution is between about pH 5 and about pH 6 when said flocculate particles are formed.

15. A method according to claim 14 wherein said flocculating agent is a cationic polymer flocculent.

16. A method for reducing the COD content created from sugar unit containing particles and soluble components from an aqueous solution, said method comprising:

treating said aqueous solution with a complexing agent to allow said complexing agent to complex with said sugar unit containing particles and soluable components, said solution having a pH which is not reduced below about 5 prior to treating said solution with said complexing agent;

adding one of either an anionic or a cationic flocculating agent to said aqueous solution in order to flocculate said complexed sugar unit containing particles and soluble components into a plurality of insoluble flocculate particles; and removing at least a portion of said insoluble flocculate particles from said aqueous solution.

17. A method according to claim 16 wherein said complexing agent includes an aluminate.

18. A method according to claim 16 wherein said complexing agent includes multivalent metal ions selected from the group consisting of $Fe^{2+}$, $Fe^{3-}$ and $Al^{3-}$ and $Ca^{2+}$.

19. A method according to claim 17 wherein the pH of said aqueous solution is between about pH 5 and about pH 10 when said flocculate particles are formed.

* * * * *